United States Patent Office 3,449,020
Patented June 10, 1969

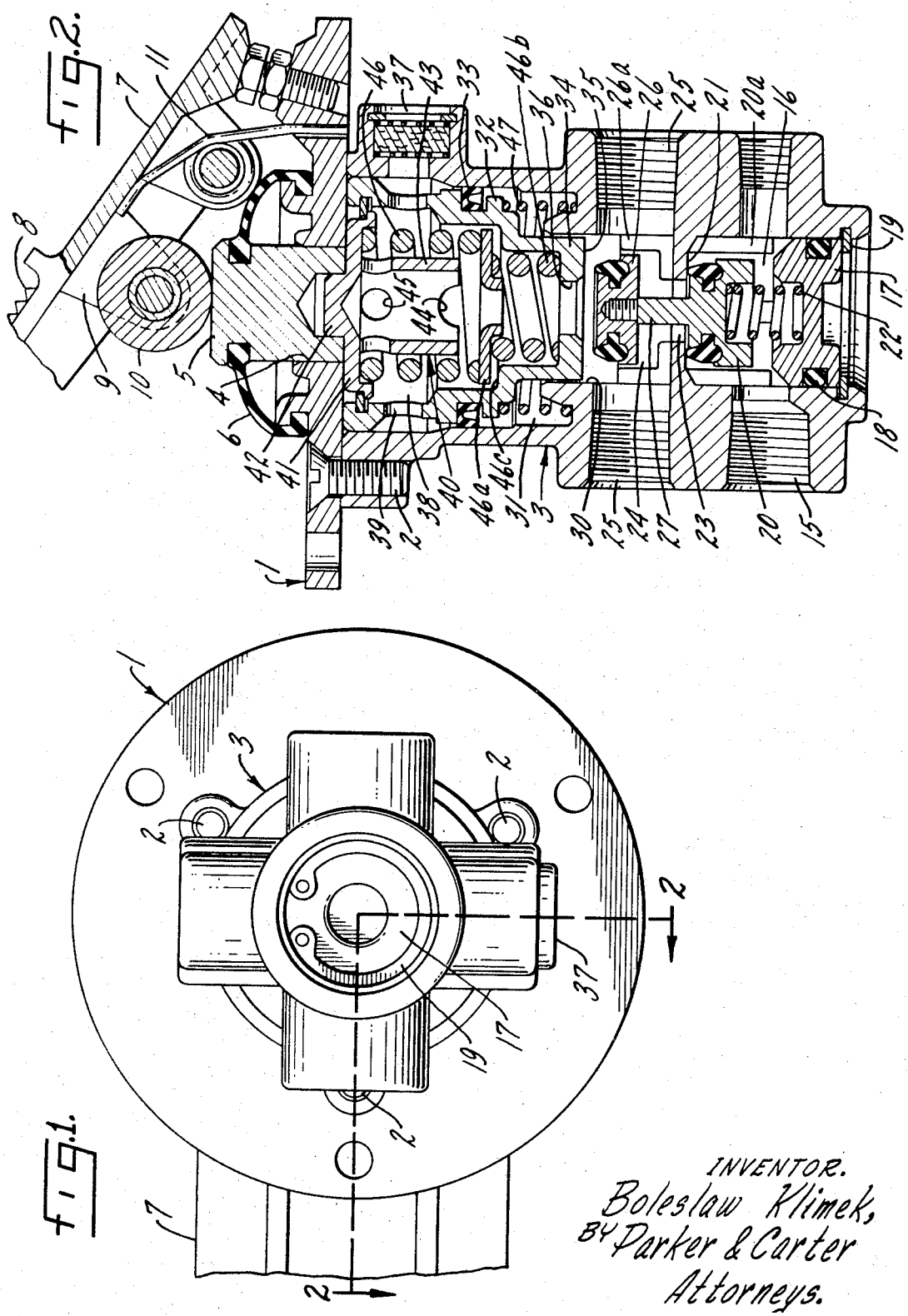

3,449,020
DUAL FORCE TREADLE APPLICATION VALVE
Boleslaw Klimek, Des Plaines, Ill., assignor to Berg Mfg.
& Sales Co., Des Plaines, Ill., a corporation of Illinois
Filed Feb. 19, 1968, Ser. No. 706,431
Int. Cl. B60t 15/12, 15/06
U.S. Cl. 303—54                    2 Claims

ABSTRACT OF THE DISCLOSURE

A brake application valve productive of small pressure output increments in response to initial brake pedal movement and of larger pressure output increments in the later brake pedal movement. The brake application valve having a valve member movable in response to a piston, a brake pedal and a variable force-transmitting assembly between the pedal and the piston. The force-transmitting assembly consists of two axially aligned springs of different force vs. deflection rates or ratios with a transmitting plate between the springs, the plate being movable into contact with the piston at a stage in brake application.

---

This application relates to fluid pressure brake systems and has particular relation to a valve effective in the application of fluid pressure to the system.

The operator of a tractor-trailer combination vehicle is frequently required to apply small increments of braking forces to the vehicle, the movement of an application valve-operating pedal determining the amount of braking action applied to the vehicle. Limited brake applications or "snub" stops are of greater frequency than maximum braking action or "panic" stops. With prior devices, employing direct relationship between pedal movement and braking forces applied to the vehicle throughout the range of available braking pressure, over-braking and under-braking frequently occurs in the lower pressure ranges as the vehicle operator attempts to apply just the right amount of braking action to the vehicle. Accordingly, it is one purpose of the present invention to provide an application valve productive of variable brake pressure outputs in relation to pedal deflection stages.

Another purpose is to provide an application valve productive of precise control over braking pressures at the lower portion of the braking pressure spectrum.

Another purpose is to provide a modulating brake application valve productive of smaller pressure output increments in relation to the amount of pedal deflection in the initial portion of pedal deflection and larger output increments in the later portion of pedal deflection.

Another purpose is to provide an application valve effective to modulate braking pressures at different rates in the low and high pressure ranges.

Other purposes will appear from time to time during the course of the specification and claims.

The invention is illustrated more or less diagrammatically in the accompanying drawings, wherein:

FIGURE 1 is a bottom plan view; and
FIGURE 2 is a side view in cross section taken on the line 2—2 of FIGURE 1.

Like parts are indicated by like numerals throughout the specification and drawings.

Referring now to the drawings, the numeral 1 generally designates a base or floor plate. Secured to one face of the plate 1, by any suitable means such as that shown at 2, is a valve housing 3. Slidable in an aperture 4 of plate 1 is an operating plug 5. A flexible dust cap 6 engages plate 1 and plug 5. An operating member 7 is pivotal on the opposite side of plate 1 from the housing 3 and includes a foot-engageable surface 8. Extending from the opposite surface of member 7 is an arm 9 rotatably carrying an operating wheel 10 in engagement with the external surface of plug 5. Yielding means 11 engages plate 1 and member 7 to urge the latter into the nonoperating position illustrated in FIGURE 2. The plug 5 thus constitutes a brake actuating member operable by pedal 7.

The housing 3 includes a fluid pressure inlet 15 adapted for connection to and communication with a source (not shown) of fluid pressure. Inlet 15 communicates with a pressure chamber 16 in housing 3. The chamber 16 is closed at one end by plug 17 carrying the seal 18 in engagement with the inner wall of chamber 16, the plug 17 being retained by retainer ring 19. Reciprocal in chamber 16 is an application valve 20 urged against the valve seat 21 by yielding means 22, the opposite ends of which engage plug 17 and valve 20. Valve member 20 rides in circumferentially spaced rails 20a.

A valve passage 23 is formed through seat 21 for communication of chamber 16 with a service pressure chamber 24 formed in housing 3. Outlets 25 communicate with service chamber 24 and are formed and adapted for connection with the vehicle brake system (not shown) for delivery of fluid pressure thereto. An exhaust valve member 26 is reciprocal in chamber 24 and is secured, as by shaft 27, to service valve member 20, the shaft 27 extending through passage 23. Valve member 26 rides in circumferentially spaced rails 26a.

A passage 30 is formed in housing 3 and extends between service chamber 24 and an enlarged chamber 31. A cup-shaped valve contacting piston member 32 is reciprocal in chamber 31, carrying the seal 33 in engagement with the inner wall of chamber 31. Piston 32 carries an axial, tubular extension 34 which is in turn loosely slidable within passage 30.

The annular end surface 35 of extension 34 constitutes an exhaust valve seat positioned for engagement with exhaust valve 26. An exhaust passage 36 extends through the extension 34 for communication of service chamber 24, when valve 26 is off seat 35, with an exhaust outlet 37 through the deep inner well or piston chamber 38 within cup-shaped piston 32 and through apertures 39 formed in the wall of piston 32.

Reciprocal within piston chamber 38 is an operating element 40 which includes the cap 41, operatively engaged as at 42 with the plug 5, and the hollow, tubular finger extension element 43. The extension 43 is open at its distal end and its end surface is recessed as indicated at 44. The circumferential base wall portion of extension 43, adjacent cap 41, has formed therein a plurality of circumferentially spaced apertures 45. Yielding means, such as the spring 46, engages cap 41 and an opposed, annular inner surface of an intermediate abutment plate 46a. Spring 46b engages the opposite surface of plate 46a and the base of extension 34. Plate 46a rides just above the annular abutment surface 46c of piston 32 when the parts are in the rest position shown in FIGURE 2. Spring 47, of lesser force than springs 46, 46a, is positioned in housing chamber 31 to engage and urge piston 32 in a direction away from exhaust valve 26. Thus elements 40, 46, 46A and 46B together constitute a variable force-transmitting assembly.

The use and operation of the invention are as follows:

It will be understood that a source of fluid pressure is connected to inlet 15 and that fluid pressure thus exists in service chamber 16. With the valve parts in the position shown in FIGURE 2, the valve member 20 closes passage 23 and the brake system connected to openings 25 is open to atmosphere through passages 30, 36, chamber 38, apertures 39 and exhaust outlet 37.

Upon downward pressure by the operator against surface 8 of member 7, the roller or wheel 10 urges plug 5 through aperture 4 of plate 1 and inwardly of chamber 38 in piston 32. The plug 5 carries cap 41 inwardly of chamber 38 to move springs 46, 46b, plate 46a, and piston 32. The strength or forces of springs 46, 46b is pre-determined so as to produce the desired movement of piston 32 in smooth, modulated response to a given movement of pedal 7, as described below. Thus piston 32 is moved toward exhaust valve 26 and extension 34 is moved through passage 30 to bring the exhaust valve seat 35, comprised of the annular end surface of extension 34, into engagement with exhaust valve 26 to close the air-brake system against exhaust to atmosphere.

Continued movement of piston 32 causes the unitary valve member 26, 27, 20 to move, thus unseating valve member 20 from seat 21 and opening communication between service chamber 16 and the air-brake system of the vehicle through service chamber 24 and outlets 25.

The fluid pressure thus created in chamber 24 and the brake system bleeds by extension 34, through the restricted passage created by the loose fit of extension 34 in passage 30, and into chamber 31 below (as the parts are shown) piston 32, thus tending to urge piston 32 against the action described above, balancing the movement of piston 32, assisting in the modulation of the brake application by the vehicle operator and reducing or precluding an undesired abrupt, rapid application of pressure forces through the valve.

When the vehicle operator desires to apply limited, precisely controlled braking action, the pedal 7 is deflected downward to the left as the parts are shown. In this initial pedal movement area, spring 46b, having a first pre-determined rate or force/deflection ratio, produces a movement of piston 32 such as to provide relatively small outputs of brake pressure per a given movement of pedal 7. Such relationship of pedal movement to brake pressure output continues until plate 46a contacts abutment surface 46c on piston 32. Thereafter, spring 46 is effective to provide a different rate or force/deflection ratio, resulting in greater increments of pressure output per a given movement of pedal 7. Thus, at the lower pressures where precise control is needed, a larger pedal movement produces a small pressure output increment, providing the vehicle operator, in effect, a larger target at which to aim. While such precise control of pressure output increments per pedal movement is less in the higher pressure output ranges, said control is of less importance in such ranges since, in such circumstances, the vehicle operator desires to apply all braking pressure available.

When foot pressure is released from member 7, yielding means 22 returns service valve member 20 to engagement with seat 21 to close the service pressure chamber 16. Yielding means 47, the pressure in chamber 24 working against seat 35 about valve 26 and the pressure bled past extension 34 through passage 30, are effective to return piston 32 to the position shown in FIGURE 2. Upon separation of extension 34 from exhaust valve 26, the exhaust channel through passage 36, chamber 38, apertures 39 an housing exhaust outlet opening 37, described above, is again opened and the fluid brake system is exhausted to atmosphere.

I claim:
1. A brake application valve assembly including a brake housing, a pressure inlet in said housing, a pressure outlet in said housing, an exhaust outlet in said housing, a valve member positioned in said housing to direct fluid pressure between said inlet and said outlets, a valve-contacting member movable in said housing, a brake-actuating pedal member movable into and out of said housing and a variable force-transmitting assembly engaging said brake-actuating member and said valve-contcting member, said force-transmitting assembly including a first spring having a first force/deflection ratio and having one of its ends in operating contact with said brake-actuating member, a second spring having a second force/deflection ratio and having one of its ends in operating contact wtih said valve-contacting member, and an abutment plate carried between and engaged by the opposed opposite ends of said first and second springs, said valve-contacting member having an abutment surface positioned for contact by said abutment plate in response to predetermined movement of said actuating member.

2. The structure of claim 1 characterized by and including a rigid member extending through said first spring and positioned to contact said abutment plate in response to predetermined movement of said actuating member.

References Cited
UNITED STATES PATENTS
3,050,344    8/1962    Kershner _____ 303—54
3,355,223    11/1967    Klimek _____ 303—52

FOREIGN PATENTS
515,440    12/1939    Great Britain.

MILTON BUCHLER, *Primary Examiner.*

JOHN J. McLAUGHLIN, JR., *Assistant Examiner.*

U.S. Cl. X.R.

137—627.5; 303—52, 56